United States Patent
Baldauf et al.

(10) Patent No.: US 9,480,961 B2
(45) Date of Patent: Nov. 1, 2016

(54) FLUIDIZED BED REACTOR

(71) Applicant: SIEMENS AKTIENGESELLSCHAFT, München (DE)

(72) Inventors: Manfred Baldauf, Erlangen (DE); Marc Hanebuth, Nuremberg (DE); Alexander Tremel, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/381,873

(22) PCT Filed: Feb. 27, 2013

(86) PCT No.: PCT/EP2013/053895
§ 371 (c)(1),
(2) Date: Aug. 28, 2014

(87) PCT Pub. No.: WO2013/127832
PCT Pub. Date: Sep. 6, 2013

(65) Prior Publication Data
US 2015/0056104 A1   Feb. 26, 2015

(30) Foreign Application Priority Data
Feb. 29, 2012   (DE) .................... 10 2012 203 080

(51) Int. Cl.
*B01J 8/18*   (2006.01)
*B01J 19/00*  (2006.01)
(52) U.S. Cl.
CPC ........... *B01J 19/0013* (2013.01); *B01J 8/1809* (2013.01); *B01J 8/1836* (2013.01); *B01J 2208/00132* (2013.01); *B01J 2219/00081* (2013.01)
(58) Field of Classification Search
CPC .............................. B01J 8/1809; B01J 8/1836
See application file for complete search history.

(56) References Cited

U.S. PATENT DOCUMENTS

| | | | | |
|---|---|---|---|---|
| 3,712,369 A | * | 1/1973 | Berlin | C22B 1/10 110/341 |
| 4,313,398 A | | 2/1982 | Ostendorf | |
| 4,808,382 A | * | 2/1989 | Cartmell | C10G 11/18 208/157 |
| 8,073,096 B2 | * | 12/2011 | El-Genk | F28D 15/0233 376/317 |

FOREIGN PATENT DOCUMENTS

| | | |
|---|---|---|
| CN | 85108257 | 8/1986 |
| DE | 2856870 A1 | 7/1980 |
| DE | 28 50 536 C2 | 2/1987 |
| DE | 3833616 | 4/1989 |

(Continued)

OTHER PUBLICATIONS

Office Action for German Application No. 102012203080.8 dated Sep. 25, 2012.

(Continued)

*Primary Examiner* — Lessanework Seifu
(74) *Attorney, Agent, or Firm* — Slayden Grubert Beard PLLC

(57) ABSTRACT

At least one heat pipe for removing heat is led into a reactor housing of a fluidized bed reactor, so that the temperature in the reactor housing can be controlled.

7 Claims, 1 Drawing Sheet

(56) References Cited

FOREIGN PATENT DOCUMENTS

| | | |
|---|---|---|
| DE | 19900116 C2 | 2/2002 |
| DE | 102012203080.8 | 2/2012 |
| EP | 0 981 018 A1 | 2/2000 |
| GB | 740567 | 11/1955 |
| GB | 755227 | 8/1956 |
| GB | 2 025 014 A1 | 1/1980 |
| GB | 1 599 398 | 9/1981 |

OTHER PUBLICATIONS

International Search Report for PCT/EP2013/053895 mailed Aug. 14, 2013.
Office Action for Chinese Application No. 201380011162.9 dated Nov. 2, 2015 with German translation.
"Heat Exchangers," vol. II, Research Institute of Petroleum Mechanics, Lanzhou, pp. 1469-1471 (7 pages) (Chinese w/ English abstract), 2013.

* cited by examiner

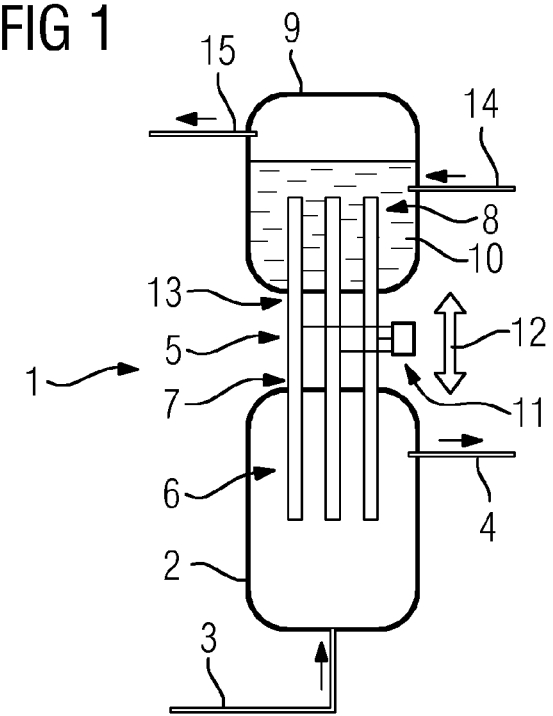
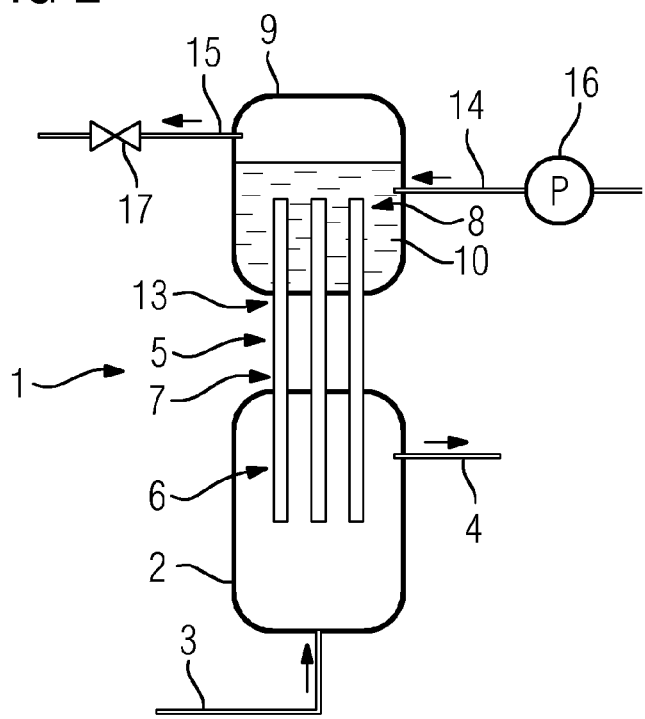

FLUIDIZED BED REACTOR

CROSS REFERENCE TO RELATED APPLICATIONS

This application is the U.S. national stage of International Application No. PCT/EP2013/053895, filed Feb. 27, 2013 and claims the benefit thereof. The International Application claims the benefits of German Application No. 102012203080.8 filed on Feb. 29, 2012, both applications are incorporated by reference herein in their entirety.

BACKGROUND

Described below is a fluidized bed reactor, having a reactor housing, in which discharge of heat out of the reactor housing is provided.

Fluidized bed reactors serve, in particular, for the large-scale implementation or execution of chemical reactions. When chemical reactions take place in them with a high heat tone (catalytic or noncatalytic), undesirable temperature rises may occur or, in a similar way, in the case of endothermal reactions, corresponding temperature drops may occur. For this reason, in the industrial implementation of such chemical transformations in a fluidized bed reactor, it is necessary to have good temperature control and corresponding temperature regulation so that the resulting reaction temperature can be set. On the one hand, heat has to be extracted from the fluidized bed (or delivered to it in the case of endothermal reactions) and, on the other, the transmitted heat quantity must be regulatable for process reasons.

Exothermal reactions mostly occur, that is to say it is necessary for heat to be transported out of the fluidized bed reactor or out of the reactor housing. One possibility for temperature regulation is to deliver cold starting material gas to the reactor, with the result that the release of heat can be compensated. The temperature of the starting material gas can influence the reaction temperature in the reactor. Mostly, however, as a last resort, a heat discharge is installed into the reactor housing, for which purpose heat exchangers in the form of tubes or plates are used. A heat transfer medium absorbs the heat of reaction. In such heat exchangers, a change of phase may also take place, for example in that the heat transfer medium used is water which evaporates directly in them. The temperature of the reaction zone is then regulated via the throughflow and the temperature rise of the heat transfer medium. However, this type of temperature regulation is not sufficiently accurate.

SUMMARY

The problem is therefore to provide a fluidized bed reactor which is improved in comparison to what is described above.

To solve this problem, in a fluidized bed reactor of the type initially mentioned, there is provision whereby, as means for the discharge of heat, one or more heat pipes, via which the temperature in the reactor housing can be regulated, are led into the reactor housing.

In the fluidized bed reactor, heat transport takes place through heat pipes which are introduced into the reactor housing or into the fluidized bed. Such a heat pipe is a heat exchanger which, utilizing the heat of evaporation of a material, makes it possible to have a high heat flux density, that is to say it is possible to transport large heat quantities on a small cross-sectional area. A heat pipe defines a usually tubular encapsulated volume which accommodates a working medium, for example water, which fills a specific defined part of the volume in the liquid state and a usually larger part of the volume in the vaporous state. When heat is introduced, the working medium begins to evaporate, with the result that the pressure in the vapor space is increased locally. The vapor which has occurred flows in the direction of a condenser where it condenses since there is a heat sink there. The previously absorbed heat leading to evaporation is thereby emitted again. The transport of heat and also the transport of the working medium from the hot end to the cold end in this case take place advantageously without a pump or the like. The processes which take place in such a heat pipe are known extremely precisely and they can therefore be mapped very accurately, thus resulting in very exact temperature regulation. On account of the continuous evaporation and condensation inside the heat pipe, there is virtually isothermal heat absorption, whereby a homogeneous temperature distribution can be achieved in the fluidized bed.

Heat pipes of this type can be produced in various configurations both with regards to the choice of material and the set-up inside the pipe and as regards the working medium used. Depending on the process taking place in the fluidized bed reactor, a corresponding heat pipe which is the most suitable possible can therefore also be selected.

For temperature regulation, two fundamental possibilities may be envisaged. According to a first alternative, temperature regulation is provided for varying the depth of penetration of the heat pipe or heat pipes into the reactor housing. According to this alternative, the heat pipe or heat pipes is or are consequently introduced into the reactor housing to a greater or lesser extent, as required. The active heat-absorbing surface of the heat pipes is thereby varied in the reaction zone. Since the transition of heat into the heat pipes is dependent upon the transfer coefficient and upon the heat transfer area, the extraction of heat and therefore the temperature in the fluidized bed can be regulated by varying the area, while maintaining a constant heat transfer coefficient. The heat pipes are introduced into the reactor housing via corresponding gas-tight connections, through which they can be displaced longitudinally so that their effective length with which they penetrate into the reactor can be set very precisely.

In this case, when a plurality of heat pipes are used, the depth of penetration of each heat pipe can be adjusted separately. This affords the possibility of carrying out highly accurate temperature regulation, and also a temperature gradient can be generated in the reactor housing by the individual heat pipes being pushed in to a different depth. Such a temperature gradient may sometimes be advantageous for the reaction which is taking place.

So that the working medium evaporated in the heat pipe condenses again, the second, cold end of the heat pipe or heat pipes is accommodated in a boiler in which, for example, water is accommodated as cooling liquid. The water absorbs heat emitted by the heat pipe end, thereby resulting in the condensation of the working medium, for example likewise water, which is evaporated in the heat pipe. The heat pipe or heat pipes is or are likewise accommodated movably with their cold end in the water boiler, that is to say, when they are moved in relation to the reactor housing, they are also moved in relation to the stationary boiler. The depth of penetration in the boiler consequently varies with the variation in the depth of penetration in the reactor housing. However, this is not so much a disadvantage for the condensation process, since heat exchange in the boiler is extremely efficient and sufficient condensation is possible even when the depth of penetration is only relatively small, that is to say the heat transfer area is therefore small. It is consequently readily possible for the heat pipe or heat pipes even to be introduced far into the reactor housing and therefore withdrawn relatively far out of the boiler, without any losses in terms of condensation efficiency being noteworthy.

To move the heat pipe or heat pipes, any actuating means may be used which is capable of displacing the heat pipes longitudinally. Electromotive, hydraulic or pneumatic actuating means are mentioned merely by way of example.

In a second regulation alternative, which may also be provided in addition to regulation by linear displacement of the heat pipes, for temperature regulation, the temperature of a heat exchanger medium, contained in the boiler in which the other, cold end of the heat pipe or heat pipes is accommodated, and/or the pressure in this boiler are/is varied. The temperature level on the cold recooled side of the heat pipes in the boiler is thereby influenced. As a result of the colder temperature on the heat pipe outside, the pressure and the temperature level inside the heat pipe also fall. This then causes a higher driving temperature difference on the evaporator side, thus making it possible to absorb a greater heat capacity. The extraction of heat and therefore the temperature in the fluidized bed can thus be regulated by the recooling temperature.

The temperature level in the boiler may either be influenced by directly influencing the temperature of the heat exchanger medium, in that, for example, thermally controlled heat exchanger medium is introduced via an inflow and an outflow. However, temperature regulation may also be set by varying the pressure in the boiler, that is to say the pressure column above the fluid heat exchanger medium. During recooling, that is to say condensation, evaporation of the heat exchanger medium, that is to say, for example, of the water, occurs in the boiler. The evaporation temperature in the boiler can in this case be influenced by the pressure level. At a higher internal pressure, evaporation takes place at a higher temperature. As a result, the driving temperature difference along the heat pipes falls and less heat can consequently be transported out of the fluidized bed reactor. A rise in pressure in the boiler therefore leads to a temperature rise in the fluidized bed. Temperature regulation can therefore also take place thereby. Heating or cooling for temperature control inside the reactor by, for example, heating coils or cooling coils, may, of course, also be provided.

As described, it is readily conceivable to combine both the first regulation variant, including the linear displacement of the heat pipes, and the second regulation variant, including the regulation of the temperature level in the boiler.

In addition to the fluidized bed reactor, a method is described below for regulating the temperature in a fluidized bed reactor, using one or more heat pipes which penetrates or penetrate with one end into a reactor housing and which penetrates or penetrate with the other end into a boiler which contains a heater exchanger medium, for temperature regulation the depth of penetration of the heat pipe or heat pipes being varied, and/or the temperature of the heat exchanger medium and/or the pressure in the boiler being varied.

As compared with the previously known art, the fluidized bed reactor and also the method are advantageous in many respects. On the one hand, isothermal heat absorption in the fluidized bed is possible, since virtually isothermal heat absorption is possible on account of the continuous evaporation and condensation inside the heat pipes. A homogeneous temperature distribution can thereby be achieved in the fluidized bed. The possibility of temperature regulation in the fluidized bed reactor is afforded by a simple regulation of pressure in the boiler. A temperature gradient can also be set in the fluidized bed when the pipes are introduced to a different depth. Furthermore, there is fundamentally also the possibility of carrying out an introduction of heat into the reactor via the heat pipes. This could be utilized to start up the fluidized bed reactor or to keep it hot. To carry out the actual chemical reaction, operation can then be reversed, that is to say the heat pipes then perform their actual function, to be precise the discharge of temperature.

BRIEF DESCRIPTION OF THE DRAWINGS

These and other aspects and advantages, features and details will become more apparent and more readily appreciated from the following description of the exemplary embodiment described below and from the accompanying drawings of which:

FIG. 1 is a block diagram of a fluidized bed reactor in a first embodiment, and

FIG. 2 is a block diagram of a fluidized bed reactor in a second embodiment.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 shows, in the form of a basic illustration, a fluidized bed reactor 1 having a reactor housing 2 in which a chemical reaction takes place, using a fluidized bed, not shown in any more detail. For this purpose, a starting material gas 3 is delivered and, after a chemical reaction, a product gas 4 is drawn off. The basic set-up of a fluidized bed reactor is generally known, as well as the various reactor or fluidized bed types, which, however, are of no importance in the present case.

To regulate the temperature inside the reactor housing 2, a plurality of heat pipes 5 which are elongately tubular are provided. These heat pipes 5 are accommodated with one end 6 inside the reactor housing 2, that is to say are located in the fluidized bed. They are led via gas-tight leadthroughs 7, not shown in any more detail, into the reactor housing 2, within which gas-tight leadthroughs 7 they are also accommodated in a longitudinally movable manner. The other end 8 of the heat pipes 5 is accommodated in a boiler 9 in which a heat exchanger medium 10, for example a liquid, such as water, is accommodated. Via an actuator 11, shown here merely illustratively, for example an electromotive or hydraulic actuating drive, the heat pipes 5 are displaceable longitudinally in the direction of the double arrow 12. That is to say, they can be moved in and out of the reactor housing 2 through the gas-tight leadthroughs 7 and can also be moved in and out of the boiler 9 through corresponding gas-tight leadthroughs 13.

In operation, that is to say when the chemical exothermal reaction is taking place in the fluidized bed, the heat pipes 5 absorb the heat in the region of their ends located in the reactor housing 2, thus resulting in evaporation of the heat transfer medium located inside the heat pipes 5. The evaporated medium travels to the colder end 8, where the heat pipes 5 transmit heat to the heat exchanger medium 10 which in this case usually evaporates. What occurs, on the one hand, is the recondensation of the heat transfer medium inside the heat pipes 5, but at the same time also the evaporation of the heat exchanger medium 10 in the boiler 9, the fluid being delivered, as illustrated by the arrow 14, and being drawn in vapor form, as illustrated by the arrow 15.

Via the actuator 11, then, it is possible to move the heat pipes 5 further into the reactor housing 2 either simultaneously and therefore together or in each case separately or to withdraw them further out of the reactor housing 2. The size of the heat transfer area of the heat pipes 5 inside the reactor housing 2 is consequently varied thereby. The further they are pushed in, the larger is the heat transfer area and the more heat can be absorbed; the further they are withdrawn, the smaller is the heat transfer area and the less heat transition is possible.

It is in this case possible always to move simultaneously all the heat pipes 5, of which any number may, of course, be provided. It is also conceivable, of course, to move only some heat pipes or to carry out movement in groups, etc. This is particularly the case when each heat pipe 5 can be moved separately, as described. It is thereby possible also to generate a temperature gradient inside the reactor housing 2.

FIG. 2 shows an alternative embodiment of a fluidized bed reactor 1, the same reference symbols being used for identical components. This fluidized bed reactor 1 also has a reactor housing 2, to which a starting material gas 3 is delivered and from which product gas 4 is drawn off. A plurality of heat pipes 5 are again provided, which engage with one end 6 into the reactor housing 2 via gas-tight leadthroughs 7 and which are accommodated with their other end 8 in a boiler 9 containing a heat exchanger medium 10, for example water, via gas-tight leadthroughs 13. Here, however, temperature regulation does not take place by linear displacement of the heat pipes 5, but instead by the temperature level in the region of the heat pipe recooling, that is to say therefore in the boiler 9, being varied. Pressure regulation takes place via the regulating valve 17. The delivery of heat exchanger medium takes place via a pump 16 which must be operated even in the case of a change in pressure in the boiler (for example, positive displacement principle). Here, too, fluid heat transfer medium 10 is delivered, as shown by the arrow 14.

It is thereby also possible to vary the temperature level in the boiler 9, without the need for pressure regulation. This is because it is possible to route correspondingly thermally controlled heat exchanger medium to the boiler 9, that is to say, consequently, more or less cold water, in order thereby to set the temperature level.

In principle, it is also conceivable to combine both design variants. That is to say, based on the configuration according to FIG. 1, it would be possible, even there, to arrange, for example, a pump 16 together with a valve 17 on the boiler 9 and thereby to vary the boiler internal pressure.

Although the invention has been illustrated and described in detail by the exemplary embodiment, the invention is not restricted by the disclosed examples and other variants may be derived from them by a person skilled in the art, without departing from the scope of protection of the invention.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A fluidized bed reactor, comprising:
   a reactor housing:
   a boiler;
   at least one heat pipe, each heat pipe extending from a reactor end extending into the reactor housing to a boiler end extending to the boiler and defining an internal heat pipe volume containing a heat transfer medium, the at least one heat pipe configured to remove heat out of said reactor housing to regulate the temperature in the reactor housing; and
   an actuating device configured to longitudinally displace each heat pipe to simultaneously vary both (a) a depth of penetration of the reactor end of each heat pipe into the reactor housing and (b) a depth of penetration of the boiler end of each heat pipe in the boiler.

2. The fluidized bed reactor as claimed in claim 1, wherein said at least one heat pipe includes a plurality of heat pipes, and wherein said actuating device adjusts each heat pipe separately.

3. The fluidized bed reactor as claimed in claim 1, wherein said actuating device includes at least one of electromotive, hydraulic and pneumatic actuating device.

4. The fluidized bed reactor as claimed in claim 3, further comprising a temperate control system configured to vary at least one of temperature of a heat exchanger medium in said boiler and pressure in said boiler to regulate the temperature in said reactor housing.

5. The fluidized bed reactor as claimed in claim 4, wherein said boiler has at least one of inflow and an outflow of the heat exchanger medium, and a heating and/or cooling system for thermal control of the heat exchanger medium.

6. The fluidized bed reactor as claimed in claim 5, further comprising a pressure regulating valve varying the pressure in said boiler.

7. A method for regulating temperature in a fluidized bed reactor having at least one heat pipe with a reactor end in a reactor housing and a boiler end in a boiler disposed outside the reactor housing and having a heat exchanger medium therein, comprising:
   controlling an actuating device to longitudinally displace the at least one heat pipe to vary both (a) a depth of penetration of the at least one heat pipe into the reactor housing and (b) a depth of penetration of the boiler end of each heat pipe in the boiler.

* * * * *